United States Patent [19]
Ikebe et al.

[11] 3,947,684
[45] Mar. 30, 1976

[54] SCINTIGRAM DISPLAY APPARATUS WITH MULTILEVEL ANALYSIS AND TWO-DIMENSIONAL INTERPOLATION

[75] Inventors: Jun Ikebe, Tokyo, Japan; Oscar Akio Nawa, Sao Paulo, Brazil

[73] Assignee: Hitachi Medical Corporation, Tokyo, Japan

[22] Filed: Sept. 27, 1974

[21] Appl. No.: 510,055

[30] Foreign Application Priority Data

Sept. 28, 1973 Japan.............................. 48-108362
Mar. 28, 1974 Japan.............................. 49-33976
Mar. 28, 1974 Japan.............................. 49-33977

[52] U.S. Cl. ............................................. 250/369
[51] Int. Cl.² ........................................ G01T 1/20
[58] Field of Search ............. 250/361, 363, 366, 369

[56] References Cited
UNITED STATES PATENTS

| | | | |
|---|---|---|---|
| 3,683,184 | 8/1972 | Brunnett et al................. | 250/369 X |
| 3,860,822 | 1/1975 | Owens, Jr. ....................... | 250/369 X |

*Primary Examiner*—Davis L. Willis
*Attorney, Agent, or Firm*—Thomas E. Beall, Jr.

[57] ABSTRACT

In the isocount scintiscanning, the detector probe is scanned over the object plane such that it is stopped at each observation point during the time T necessary for the input pulses to reach a preset value N. The count rate $R = N/T$ is then calculated electronically and the two-dimensional array of said count rate $R_{i,j}$, output of said isocount scanner, is read in the memory of the display system, which is the subject to the present patent. These data are read out from said memory in synchronism with the television horizontal sweep signal; each value of count rate $R_{i,j}$ is compared to a reference slice level $a_k$ and if $R_{i,j} \geq a_k$, black is assigned to the corresponding picture element on the screen; if $R_{i,j} < a_k$, white is assigned to the corresponding element on the screen. If said slice level $a_k$ is changed sequentially with convenient velocity, there is observed on the screen a kind of silhouette corresponding to those areas with count rate higher than the slice level $a_k$, and said silhouette moves by changing its form. The human sensors are very keen to variations and this process makes the detection of details of the picture very easy. Moreover, a two-dimensional interpolation is employed in order to display the picture with 3 mm × 3 mm elements, for example, from data taken 6 mm apart. By this expedient, it is possible to compose a scintigram in a shorter scanning time, without deterioration of picture quality.

14 Claims, 16 Drawing Figures a. $S_T = 56$    b. 51    c. 49    d. 45
e. 40    f. 37    g. 36    h. 34
i. 32    j. 31    k. 29    l. 28

03    19    24    30
36    41    47    58
66    74    89    105

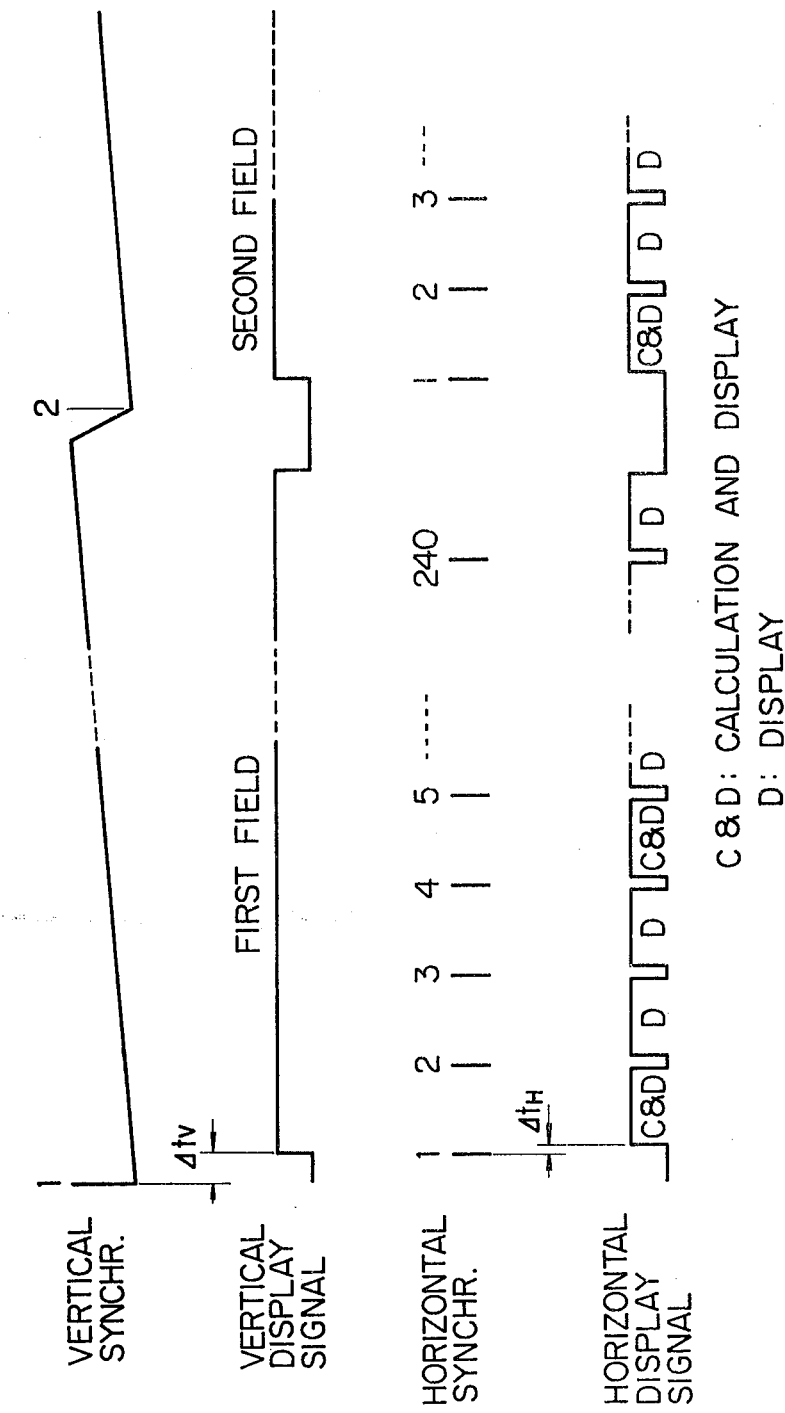

SCINTIGRAM DISPLAY APPARATUS WITH MULTILEVEL ANALYSIS AND TWO-DIMENSIONAL INTERPOLATION

BACKGROUND OF THE INVENTION

The present invention relates to scintigram display apparatus provided with multilevel analyzer that makes easy and precise the analysis of scan data gotten by an isocount scintillation scanner. A scintigram display apparatus with two-dimensional interpolation which allows composition of a high quality scintigram within short scanning time is also described.

In the isocount scintiscanning, the detector probe is moved rectilinearly within the limit switches and within a plane over the object under examination. At each observation point, the time T necessary for the radiation to reach a preset value N is measured. From said values N and T, the count rate $R = N/T$ is calculated electronically and a set of two-dimensional array of count rate $R_{i,j}$ ($i = 1, 2 \ldots, m; j = 1, 2 \ldots, n$) corresponding to each picture element is gathered as data.

A widely used recording and displaying means of said data has been the photographic film. In a photoscintigram the two-dimensional array of $R_{i,j}$ is recorded on the film as a picture element with density proportional to $R_{i,j}$. The diagnosis is based on said picture constituted by variation of gray scale level. It is known, however, that the human eye can distinguish at most ten different levels on a monochromatic film, a very low perception ability. On the other hand, some very unstable parameters such as the adjustment of light source intensity and film developing conditions makes the diagnosis based on monochromatic film somewhat unstable and with poor reliability.

On the other hand, in the isocount scintiscan, the data are normally taken 3 mm apart, for instance, and each picture element is a square 3 mm × 3 mm. If the measurements are taken 6 mm apart and the present value maintained the same N, the observing time may be reduced to about 1/4. Even considering the time necessary for moving the detector probe and the scanning of background region, the entire measuring time may be considerably reduced. However, if the picture element size was taken to be 6 mm square, the resulting scintigram should be rough and constitute an embarrassment in its interpretation.

This invention aims at alleviating the above mentioned difficulties and prevents a display apparatus that enables a stable composition of scintigrams in an easily interpreted form through multilever analyzer. Another objective of this invention is to present a display system that shortens the scanning time by composing a scintigram with 3 mm × 3 mm picture elements, for instance, from data taken 6 mm apart, through two-dimensional interpolation. This process yields an improved picture quality without any loss of details.

In order to achieve these goals, the count rate $R_{i,j}$ distributed in a two-dimensional array, gathered by the isocount method, are read in the memory in the same sequence that they are taken. Then, $R_{11}, R_{12} \ldots R_{1n}$; $R_{21}, R_{22} \ldots, R_{2n}$, etc. are read out in that order, in synchronism with the television horizontal sweep signal. If $R_{ij}$ is larger than or equal to a certain slice level $a_k$ ($R_{ij} \geq a_k$), black is assigned to the corresponding element; if $R_{ij}$ is smaller than the slice level $a_k$ ($R_{ij} < a_k$), white is assigned to that element and displayed on the screen. By this means, a kind of silhouette corresponding to a section of scan data at said slice level $a_k$ is seen on the television screen. If said level $a_k$ is changed sequentially at a suitable speed, the silhouette gets movement by changing it form. Human sensors are very sensitive to variations, particularly the eye, and this procedure makes the feature extraction from the scintigram very easy.

On the other hand, a two-dimensional interpolation that allows display of 3 mm square pictures elements from data taken 6 mm apart is also presented in this invention and is based on the following principle. The object plane should be constituted by small square picture elements regularly distributed. The measurements are made at the intersections of odd numbered horizontal lines with odd numbered vertical lines that constitute the boundary of said picture elements. The count rate of each picture element is determined by the nearest three measurements in the following fashion: a column of height $X_{ij}$, the result of measurement, is placed at each measuring point; a plane is determined by said three nearest columns; the height up to this plane at the center of each picture element is adopted as the value of its count rate. The scanning time may be reduced considerably by this means, without deterioration of picture quality.

Other objectives, chacteristics, effects, and more details are described by the drawings and explanation of the preferred embodiments.

BRIEF DESCRIPTION OF THE DRAWING

Further objects, features and advantages of the present invention will become more clear from the following detailed description with respect to the drawing wherein:

FIG. 15 illustrates the mechanism of constitution of a field on the television screen.

DETAILED DESCRIPTION OF THE INVENTION

This invention relates to a multilever analyzer that allows the display of scan data gathered by isocount method in an easily analyzable form. Moreover, it permits the composition of picture elements with, say, 3 mm × 3 mm. size, from data taken 6 mm apart, by means of two-dimensional interpolation. With this process, said display allows composition of a high quality scintigram within short scanning time.

Multilever Analyzer

Figure 1:
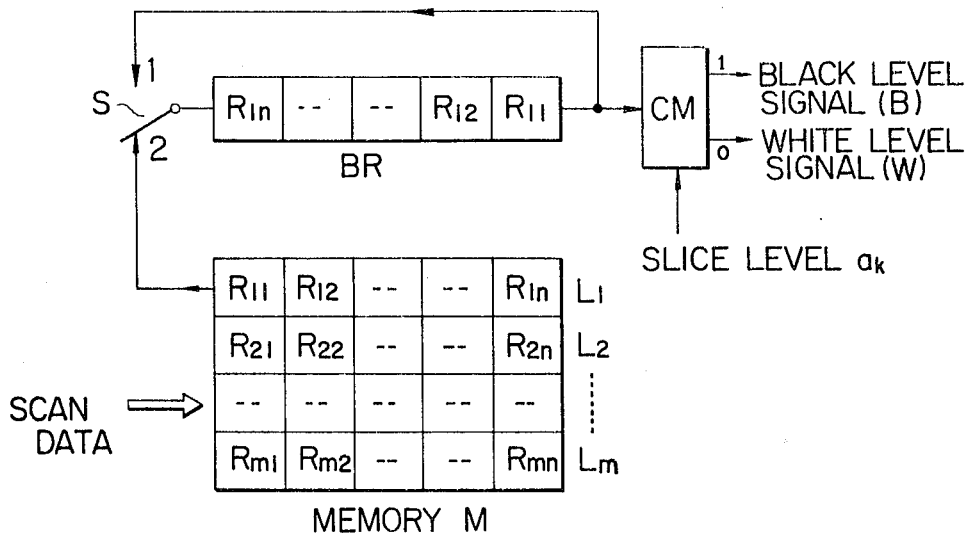
FIG. 1 illustrates one possible embodiment of the present invention. It shows how the display signal corresponding to black or white is constituted from the picture data.

FIG. 1 illustrates an embodiment of the present invention when a shift register memory is used as storage means. It is supposed that $P = m \times n$ data $R_{ij}$ ($i = 1, 2 \ldots m; j = 1, 2 \ldots n$) are already in the memory M, by direct read in or by means of paper or magnetic tape. To begin with, the data $R_{11}, R_{12} \ldots , R_{1n}$ in line $L_1$ are transferred to the buffer register BR through the switch S. The buffer register BR is a shift register; each stage contains a number of bits sufficient to memorize the value of a data $R_{ij}$, and the data may be shifted from left to right in synchronism with the television (not shown) horizontal sweep signal. When the silhouette is displayed, the electronic switch S must be turned upwards (contact 1) and the data corresponding to one line $R_{11}, R_{12} \ldots , R_{1n}$ are recirculated 3 or 4 times. This operation yields the width of each picture element on the screen in the vertical direction. The value of $R_{ij}$ the rightmost datum in the buffer register BR, is compared with the present slice level $a_k$, by the comparator circuit CM. If the value of $R_{ij}$ is larger than or equal to $a_k$, the CM circuit produces a signal (B) corresponding to the black level on the screen. If $R_{ij}$ is smaller than $a_k$, a white level signal (W) is produced by the CM circuit. The elements of line $L_1$ are displayed on the screen by the above described process. During the last recirculation of data $L_1$, the electronic switch S is turned downwards (contact 2) and the data of the second lime $L_2$ are transferred into the buffer register BR. All the processes are repeated up to line $L_m$, when everything restarts with line $L_1$. The resulting picture on the television screen is a silhouette of a section of the scintigram sliced at a certain level $a_k$. If the slice level $a_k$ is changed, a sequence of section silhouettes at those levels is obtained on the screen.

Figure 2:
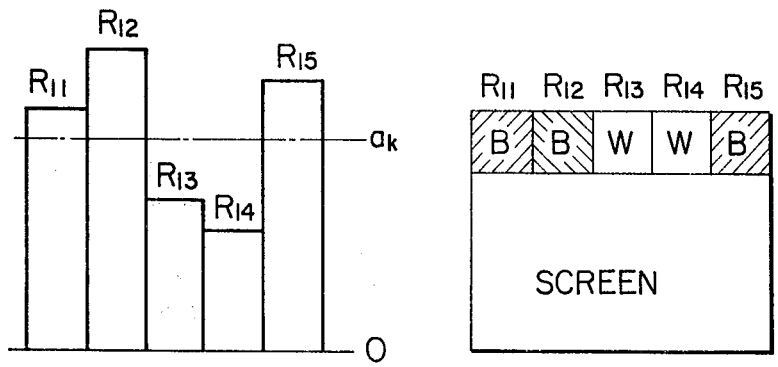
FIG. 2 shows the conversion of scan data into a sequence of two-colored picture elements.

FIG. 2 illustrates a situation where the data of line $L_1$ are sliced by the reference level $a_k$ and also shows the corresponding sequence of black and white picture elements on the television screen.

Figure 3:
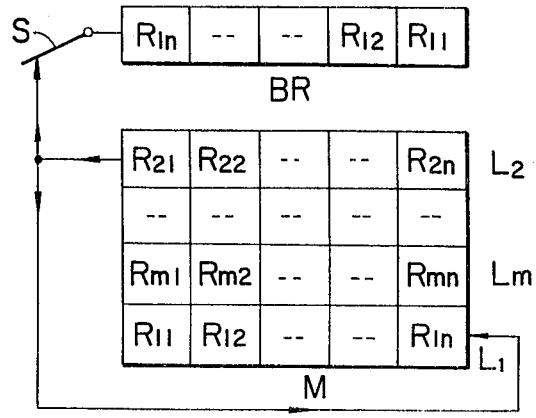
FIG. 3 illustrates how the data circulate within the memory and buffer register BR.

FIG. 3 shows the distribution of data in the main memory M after transfer of data constituting the first line $L_1$ to the buffer register BR. In other words, the main memory M is also constituted by a shift register so that the data in line $L_1$ are transferred to the buffer register BR and at the same time the whole content of the memory M is shifted such that line $L_1$ is recirculated through the tail of the memory M. As shown in FIG. 3, after $n$ shift pulses, the data of line $L_1$ are transferred to the buffer register BR and at the same time the content of memory M is advanced one row, that is, the content of line $L_2$ that was in the second row are moved to the top, and the data of line $L_1$ formerly at the top row are transferred to the last row. From this situation, if n more shift pulses are applied, the line $L_2$ at the top of memory M is displayed automatically.

Figure 4:
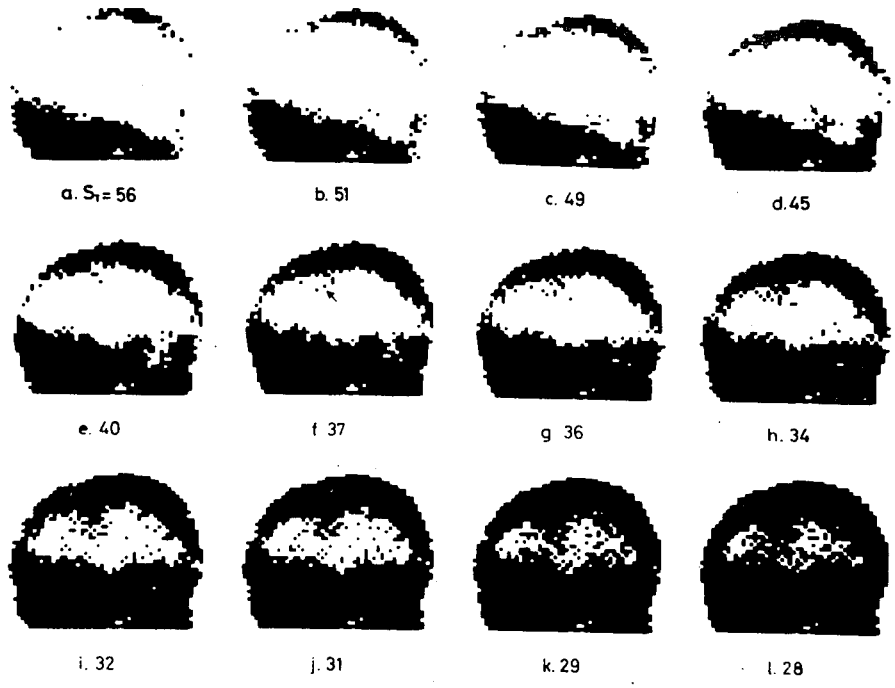
FIG. 4 shows an example of a sequence of scintigram composed by the present invention.

FIG. 4 is a sequence of pictures taken from the television screen, when the silhouettes of a case with metastatic carcinoma of the brain was analyzed by the above described method and the value of sequentially changed slice level $a_k$ are also indicated below each silhouette. When the slice level is lowered to 45, a tumor becomes clearly visible in the posterior fossa, as indicated by the arrow in FIG. 4d. Lowering further the slice level $a_k$, some deposits seeming to be abnormal are seen in the parietal region, as indicated by the arrow in FIG. 4f. At this stage, however, another lesion is suspected but nothing is definite. The slice level $a_k$ is lowered further more and finally the existence of a second tumor becomes clear. This expedient facilitates a lot of the interpretation of scintigrams, avoiding overlook abnormalities. It seems that multilever analysis will become a very useful tool for diagnosis in clinical medicine. Specially in the cold area (where the count rate $R_{ij}$ is low), a very important area for analysis in the case of the brain, even small uptake ratios become clearly distinguishable. This was very difficult in the usual photoscintigram.

It should be noted that the coefficient of variation $\epsilon(R) = \sigma(R) / E(R)$ of each count rate R taken by the isocount scanner is constant ($= 1 / \sqrt{N}$) over the entire observed plane, and as a consequence in places where the expectation $E(R)$ is relatively high, the standard deviation $\sigma(R)$ will be also relatively high and it is meaningless to vary $a_k$ by a small amount. On the contrary, in places where the expectation $E(R)$ is low, the standard deviation $\sigma(R)$ will also be small, allowing a detailed analysis of cold areas.

Furthermore, the input signal to the television in the multilevel analyzer described in the present invention is an electric signal corresponding to a numerical value, free from some sensible parameters like light source adjustment and film developing conditions involved in the photoscintigram, allowing a very stable and reliable picture. Finally, in the above description, the input signal to the television produced levels corresponding to black and white. That signal, however, is not restricted to black and white; any two other colors may be used.

Extended Multilever Analyzer

Figure 5:
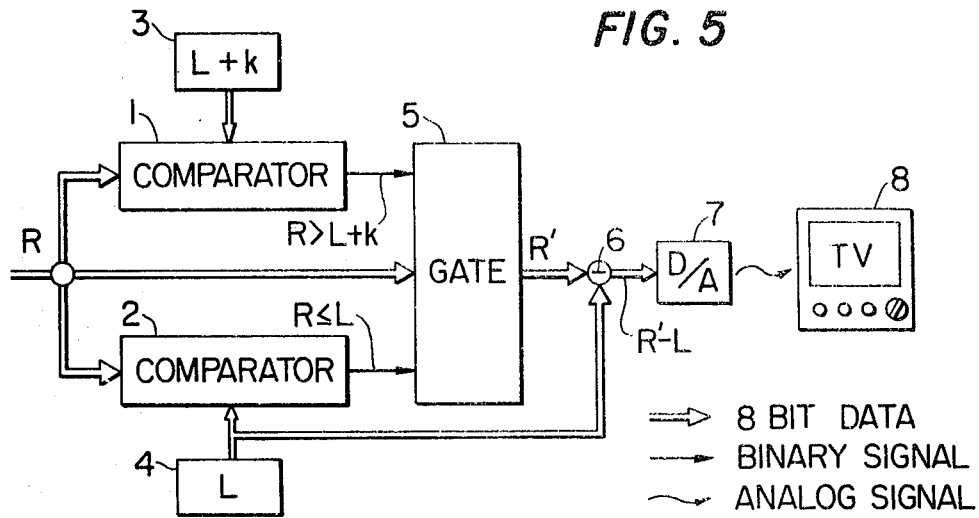
FIG. 5 is a block diagram of another embodiment of the present invention.

FIG. 5 illustrates a partial block diagram of a second embodiment of the present invention. In the first embodiment described above, the two-dimensional array of count rate data stored in the memory were sequentially read out and compared to a preset slice level $a_k$. In the second embodiment illustrated in FIG. 5, two reference levels L and $L + k$ are prepared; if the read out datum R is lower than L, a white picture element is produced; if R is higher than $L + k$, a black picture element is produced and if R falls between L and $L + k$, that picture element will have a gray level proportional to $R - L$. Changing sequentially said reference level L from zero to the maximum allowable value, the resulting sequence of pictures is observed.

Each datum (or word) R sequentially read out from the memory corresponds to a picture element and is constituted by 8 bits, for example. Two comparator circuits 1 and 2 make the comparison of R and $L + k$ or L, respectively. Blocks 3 and 4 represent reference level generating circuits which produce binary coded values of $L + k$ and L. The gate circuits 5 selects those elements with count rate R' satisfying the condition L $R' \leq L + k$ and send them to the subtractor 6. The value of $R' - L$ is gotten by the subtractor circuit 6, which is converted into an analog signal by the digital - to - analog converter 7. The analog signal corresponding to $R' - L$ is applied to the television 8, producing a gray level proportional to that signal on the screen.

Figure 6:
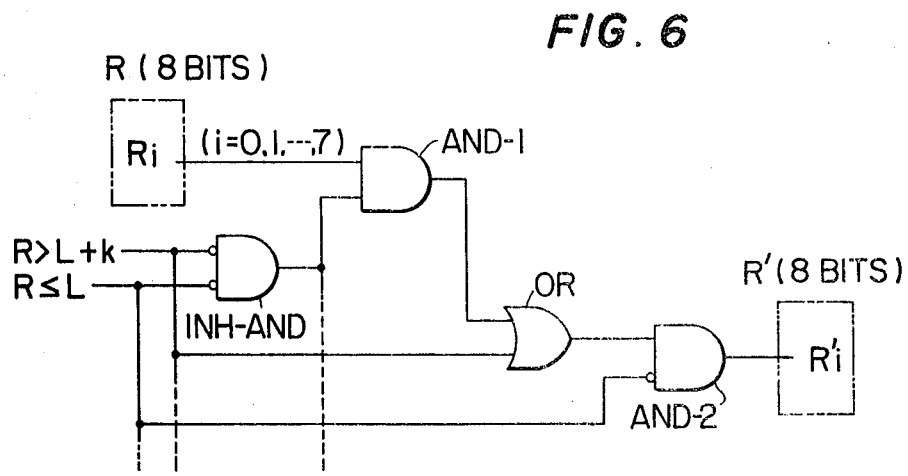
FIG. 6 is a partial detailed circuitry of FIG. 5; it extracts those R' satisfying the relation $L R' \leq L + K$.

FIG. 6 illustrates an embodiment of a logical circuit that extracts those values of R' among R satisfying the condition L R' $\leq$ L + k. Each bit of R is called $R_i$ ($i = 0, 1 \ldots, 7$), so that eight circuits similar to this constitute the entire circuit. IF $R > L + k$, we will have a logical state $[R > L + k] = 1$, the output of INH-AND circuit will be "0" and $R_i$ will not go beyond the gate AND—1. At the same time, the condition $R > L$ will yield $[R \leq L] = 0$; gate AND—2 will be opened and the signal $[R > L + k] = 1$ will go through gates OR and AND—2, making each bit at the output go to logical "1", that is, R' will get its maximum value (255 for 8 bits). Now, if $L + k \geq R > L$, we will have $[R > L + k] = 0$ and $[R \leq L] = 0$; the value of $R_i$ will appear at the output terminals through gates AND—1, OR, and AND—2, yielding selection of count rates satisfying the condition $L < R' \leq L + k$. $R_1'$ ($i = 0, 1 \ldots, 7$) represents each bit of R'. Finally, when $R \leq L$, we will have $[R \leq L] = 1$ and $[R > L + k] = 0$, making each bit $R_1'$, at the output, go to the logical "0", that is the smallest value.

Figure 7:
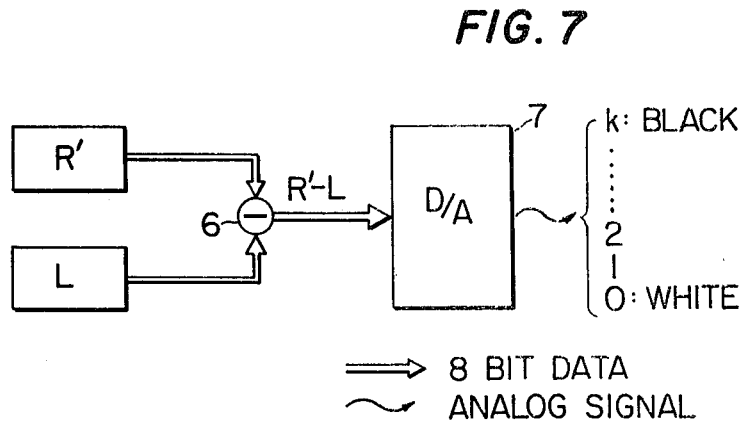
FIG. 7 is a block diagram of the circuits that constitute the beam intensity modulation signal.

FIG. 7 illustrates a circuit that constitutes a signal necessary for producing a convenient gray level for those binary coded R' satisfying the condition $L < R' \leq L + k$. In other words, the subtractor 6 determines the value $R' - L$ and this difference is transformed to an analog signal by the D/A converter 7, producing an intensity modulation analog voltage corresponding to a gray level between white and black. In this subtractor, when the difference is zero or negative, the logical "0" is produced as the output.

Figure 8:
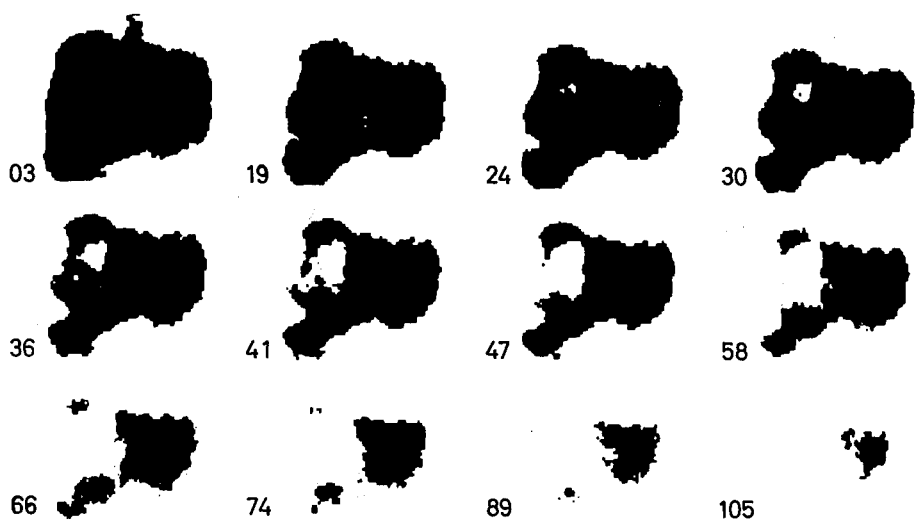
FIG. 8 is an example of a sequence of scintigram obtained by using the circuits shown in FIG. 5.

If the value of L is sequentially changed from zero to the maximum value, and the above mentioned process is executed, the picture on the television screen will not be static but rather will be a sequence of changing pictures, making the details at some count rate level appear clearly, according to the value of L. FIG. 8 shows an example of liver analyzed by this method. If the value of k is taken to be zero ($k=0$), a binary picture is obtained and it corresponds to the first embodiment shown in FIG. 1.

With the embodiment shown in FIG. 5, the data between L and $L + k$ will be displayed by a gray level proportional to its numerical value, so that if for instance $k = 10$, even a single bit will be distinguishable within this band. As L is sequentially changed, any detail will be clearly visualized, which avoids overlooking lesions. This process is equivalent to an enlargement of the dynamic range of the television screen characteristics. Two-Dimensional Interpolation Another aspect of the present invention is to shorten scanning time by displaying a picture element with size of 3 mm × 3 mm, for example, composed by two-dinensional interpolation from data taken 6 mm apart. An example of embodiment is explained by using FIG. 9.

Figure 9:
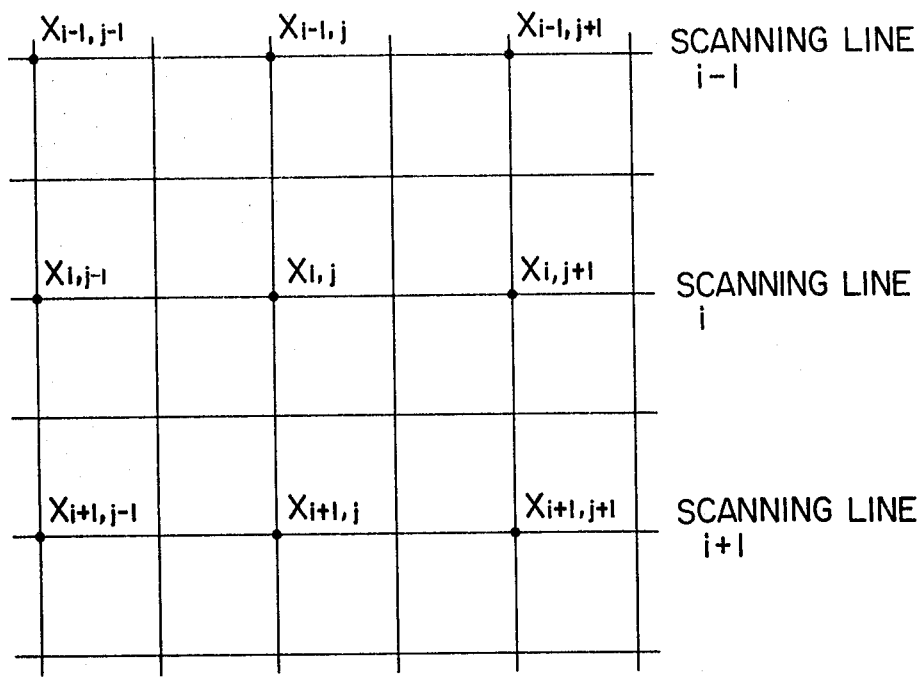
FIG. 9 shows the distribution of the measuring points $X_{ij}$ on the object plane.

As shown in FIG. 9, the object plane is sectioned into small square picture elements. The intersections $X_{ij}$ of odd numbered vertical lines with odd numbered horizontal lines that constitute the boundaries of each picture element, are the observation points where the date are sampled. The scintillation detector stops successively just over each $X_{ij}$ and measures the gamma-ray intensity, based on the isocount scanning principle. Each count rate obtained at an observation point will be also called $X_{ij}$, for there is no danger of confusion. Each value of the count rate $X_{ij}$ is recorded on paper or magnetic tape. Once the whole scanning is completed, these data are read in the memory of the display system. During the display, the count rate $R_{ij}$ of each picture element is calculated from those data $X_{ij}$ stored in said memory by means of two-dimensional interpolation.

Figure 10:
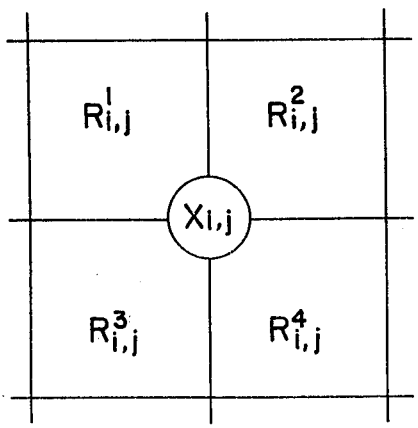
FIG. 10 shows the relative positions of picture elements $R_{ij}^k$ around the measuring point $X_{ij}$.

If the four nearest points are considered for two-dimensional interpolation, the following relation is used:

$$\begin{bmatrix} R_{i,j}^1 \\ R_{i,j}^2 \\ R_{i,j}^3 \\ R_{i,j}^4 \end{bmatrix} = \frac{1}{4 \sum_{k=1} \alpha_k} \begin{bmatrix} X_{i,j} & X_{i-1,j} & X_{i,j-1} & X_{i-1,j-1} \\ X_{i,j} & X_{i-1,j} & X_{i,j+1} & X_{i-1,j+1} \\ X_{i,j} & X_{i,j-1} & X_{i+1,j} & X_{i+1,j-1} \\ X_{i,j} & X_{i,j+1} & X_{i+1,j} & X_{i+1,j+1} \end{bmatrix} \begin{bmatrix} \alpha_1 \\ \alpha_2 \\ \alpha_3 \\ \alpha_4 \end{bmatrix} \quad (1)$$

where $\alpha_k$ ($k = 1, 2, 3, 4$) are weighting factors. The relative positions of the picture elements $R_{i,j}^1$, $R_{i,j}^2$, $R_{i,j}^3$, $R_{i,j}^4$, to the observation point $X_{i,j}$ are shown in FIG. 10.

As the input pulse train constitutes a Poisson process, and as the observing times are not overlapped, the measured values $X_{i,j}$ in Equation (1) are statistically independent. For the sake of simplicity, if:

$$R = \Sigma \alpha_k X_k / \Sigma \alpha_k \quad (2)$$

the expectation E(R) and the standard deviation $\sigma$ (R) of the count rate R of a picture element are given respectively by:

$$E(R) = \Sigma \alpha_k E(X_k) / \Sigma \alpha_k \quad (3)$$

$$\sigma(R) = [\Sigma \alpha_k^2 \sigma^2 (X_k)] / \Sigma \alpha_k \quad (4)$$

From the above relations, the coefficient of variation is calculated and yields:

$$\epsilon(R) = \sigma(R) / E(R) = [\Sigma \alpha_k^2 \sigma^2 (X_k)] / \Sigma \alpha_k E(X_k) \quad (5)$$

The full width at half maximum (FWHM) of the collimator response curve on the focal plane is usually about 15 mm and if the observations are made 6 mm apart, for instance, the expectation and the standard deviation of $X_k$ may be considered to be very close, that is, $E(X_k) \cong E(X)$, $\sigma(X_k) \cong \sigma(X)$, $k = 1, 2, 3, 4$. Substituting these relations in Equation (5), the following equation is obtained:

$$\epsilon(R) \cong [\Sigma \alpha_k^2] \sigma(X) / \Sigma \alpha_k E(X) = [\Sigma \alpha_k^2] \epsilon(X) / \Sigma \alpha_k \quad (6)$$

As the value of each count rate $X_{i,j}$ is determined by the isocount method at the corresponding observation point $\epsilon(X) = 1/\sqrt{N}$, and substituting this value in Equation (6), the fillowing relation is obtained:

$$\epsilon(R) [\Sigma \alpha_k^2] / \sqrt{N \Sigma \alpha_k} \quad (7)$$

Figure 11:
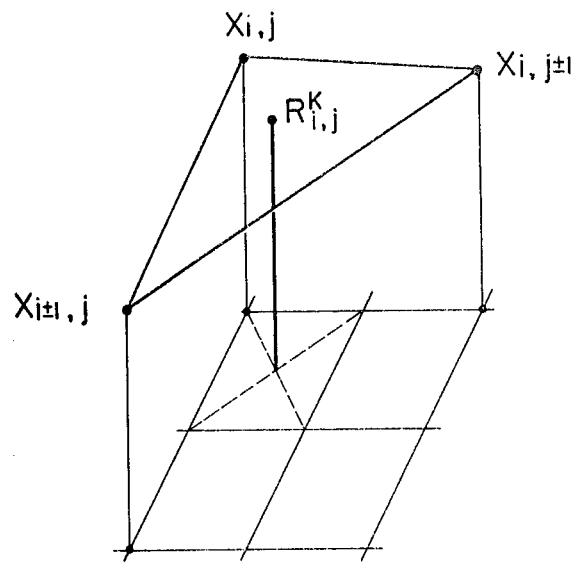
FIG. 11 illustrates how the value of the count rate $R_{ij}^k$ of a picture element is determined from the measured values $X_{ij}$ through two-dimensional interpolation.

Many combinations of the weighting coefficients are possible. According to the Shannon sampling theorem extended to the two-dimensional case, the following approximate result is obtained: $\alpha_1 = 9$, $\alpha_2 = \alpha_3 = b$, $\alpha_4 = 1$. From the standpoint of interpolation, the following combination is adopted: $\alpha_1 = 2$, $\alpha_2 = \alpha_3 = 1$, $\alpha_4 = 0$. This is equivalent ot take as the count rate of each picture element equal to the height at its center up to the triangle determined by the three nearest columns with height equal to the respective count rate measured at each observation point. This situation is depicted in FIG. 11. In other words, the interpolation is proceeded by taking the three nearest measurements. Introducing the above coefficients in Equation (1), the following relations that determine the count rate of each picture element are given:

$$R_{i,j}^1 = \frac{1}{4} [ X_{i-1,j} + X_{i,j-1} + 2 X_{i,j} ] \quad (8\text{-}a)$$

$$R_{i,j}^2 = \frac{1}{4} [ X_{i-1,j} + X_{i,j+1} + 2 X_{i,j} ] \quad (8\text{-}b)$$

$$R_{i,j}^3 = \frac{1}{4} [ X_{i,j-1} + X_{i-1,j} + 2 X_{i,j} ] \quad (8\text{-}c)$$

$$R_{i,j}^4 = \frac{1}{4} [ X_{i,j+1} + X_{i+1,j} + 2 X_{i,j} ] \quad (8\text{-}d)$$

The coefficient of variation given by Equation (7) will become:

$$\epsilon(R) = \sqrt{6}/4 \sqrt{N} \simeq 1 / \sqrt{2.7N} \quad (9)$$

Equation (9) shows that this interpolation yields an effective multiplication of the preset number N by a factor of 2.7. The statistical fluctuations are reduced by this factor, still improving the picture quality.

Figure 12:
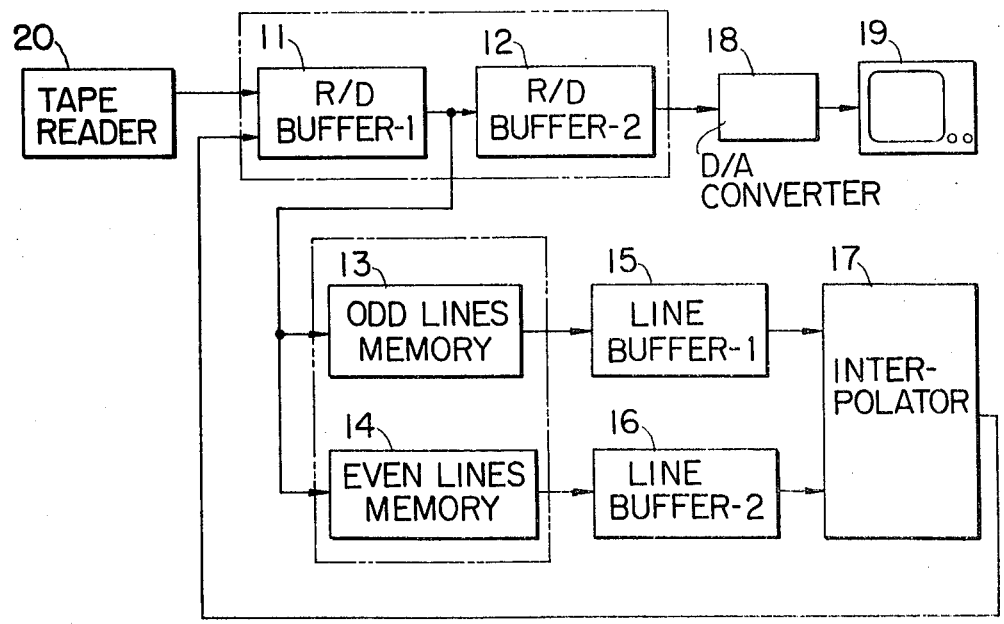
FIG. 12 is a block diagram of the display system described in the present invention.
Figure 13:
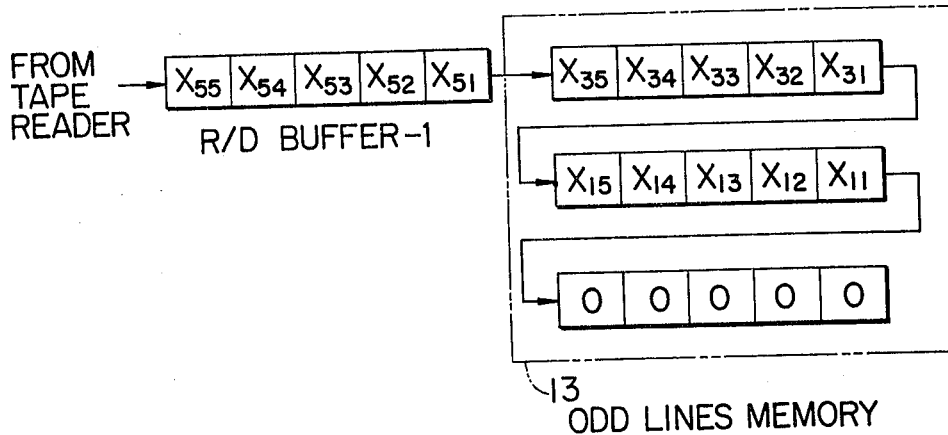
FIG. 13 illustrates the situation when the two first odd lines are read in the memory.
Figure 14:
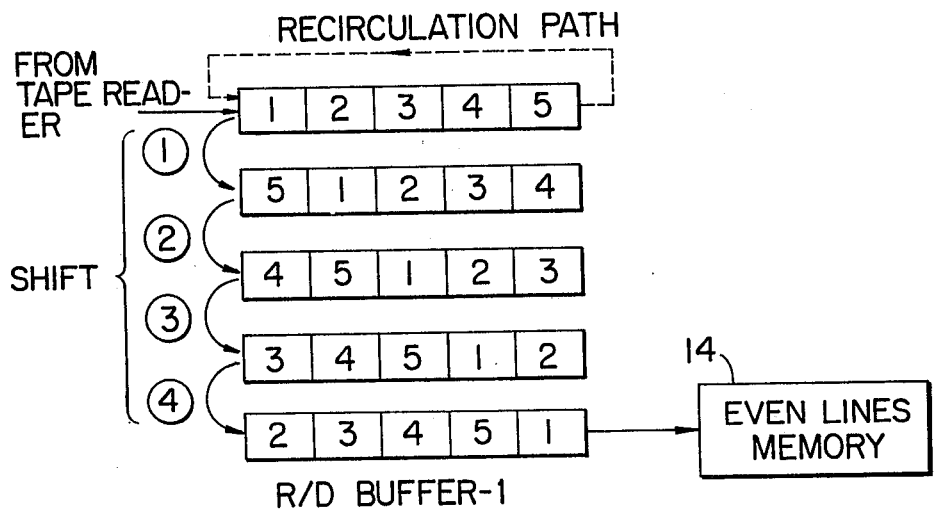
FIG. 14 shows the steps used to read in one data in the even lines memory.

FIG. 12 is a block diagram of an embodiment of the display system with interpolation. In FIG. 12, blocks 11 and 12 are (read/display buffers) R/D buffers —1 and —2; 13 and 14 are main memories; 15 and 16 are line buffers —1 and —2, respectively. The system shown in FIG. 12 works in two different cycles: "read in" and "display". In the read in cycle, the data of one line $X_{i,j}$ ($j = 1, 2, \ldots$) are stored in the main memory through R/D buffer —1 (block 11). As the scanning is proceeded in a reciprocated motion, and it is desirable to store the data as they were gathered always in the same direction, it is necessary to store the even lines upside down. The R/D buffers and the main memories are constituted by shift registers as shown in FIGS. 13 and 14. Odd lines are stored in the corresponding main memory 13 directly from R/D buffer —1. The mechanism of storing even lines is shown in FIG. 14. If, for example, one line is constituted by five words, four pulses are used to circulate the whole data and the fifth pulse is used to store one word in the even line main memory 14. By repeating this process five times, a complete line is stored in the main memory. This mechanism allows to store the whole data in the main memory in sequence suited to be displayed in synchronism with the horizontal sweep signal of the television.

The END code on the tape finishes the read in cycle and makes start of the display cycle automatically. In this cycle everything moves in synchronism with the horizontal and vertical sweep signals of the television. FIG. 15 shows some details of such a mechanism. The first field on the standard television screen is composed of 246.5 lines, among which 240 are modulated by the scan data. Three consecutive lines (e.g., lines 2, 3, and 4 in FIG. 15) are modulated by the same data in order to produce the necessary width of a picture element in the vertical direction. During this process, these data are recirculated two times within R/D buffers —1 and —2, connected in series in FIG. 12. During the display of lines $3n + 1$, ($n = 0, 1, 2, \ldots 79$), the data for this line are displayed and at the same time the data for the next line are accumulated in said buffer —1 (11) and —2 (12). The number of interpolated data in each line will be twice the number of originally scanned data, so two buffers —1 and —2 with the same length become necessary in the display cycle. The data for each picture element are determined by the interpolator 17 by using the relations (8-$a$) to (8-$d$). As shown by these relations, the data of each scanned line are used twice alternately, and as the recicculation speed of data within the main memory is not enough, line buffers —1 and —2, 15 and 16, become necessary.

Figure 16:
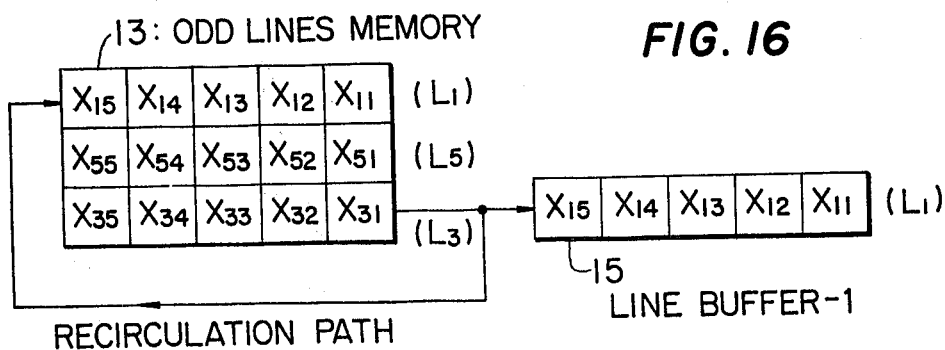
FIG. 16 shows the read out of data from the main memory described in the block diagram of FIG. 12 and the recirculation path.

FIG. 16 shows the distribution of data within the odd line memory 13 after transferring the data of the first line to the line buffer —1. In other words, the main memory is also constituted by shift registers provides with a recirculation path as shown in this figure. The shift pulses are synchronized with the television horizontal sweep signal. The read out signal of a line is synchronized with the television vertical sweep signal.

The second field is a repetition of the process mentioned above, and both fields together constitute a complete frame on the screen.

As shown in FIG. 12, the output of R/D buffer —2, block 12, is transformed into analog signal by the D/A converter 18, and applied to the television 19, as beam intensity modulation signal, in order to compose the scintigram on the screen. Finally, block 20 in FIG. 12 is the tape reader used as the means to transfer the data on a paper type into the display system.

In conclusion, the two-dimensional interpolation allows determination of the count rate of each picture element from data sampled sparsely, shortening considerably the entire scanning time; some ¼ measuring points are taken relative to the number of picture elements. Due to the smoothing effect involved in the interpolation, spurious dots are eliminated, improving further the picture quality. Another aspect is the elimination of light intensity adjustment and the conditions of film development that constitute some sensible parameters in the monochromatic film display system. A picture always stable and with adjustable contrast is obtained.

While several embodiments of the present invention have been shown and described in detail, further embodiments, modifications and variations are contemplated according to the broader aspects of the present invention, all as determined by the spirit and scope of the following claims.

We claim:

1. A scintigram display apparatus employing a television display means having a screen, a beam intensity modulator and a sweep signal, comprising:
   a. scintillation scanning means for two-dimensionally scanning over an object emitting gamma-rays and measuring the input gamma-rays for producing a two-dimensional array of output signals correlated to the two-dimensional array of gamma-radiation from the object:
   b. memory means for storing the two-dimensional array of said output signals from said scintillation scanning means;
   c. means for reading out the data coresponding to one scan line of the two-dimensional array from said memory means;
   d. comparator circuit means for comparing each datum from said reading means, in synchronism with the television sweep signal, with a preset slice level and therby generating a binary signal as the result of such comparison;
   e. circuit means for applying said binary signal as the television beam intensity modulator to assign two different colors on the screen corresponding to the binary signal; and f. means for changing sequentially said slice level to produce a corresponding sequence of silhouettes of the scanned object on the television screen in at least said two colors.

2. A scintillation display apparatus as defined in claim 1, further comprising a second comparator circuit means for comparing the data from said reading means, in synchronism with the television sweep signal, and said two comparator circuit means using respectively two reference levels $L$ and $L + k$; said circuit means assigning a white picture element on said television screen to those data smaller than $L$, a black picture element to those data larger than $L + k$, and a gray level picture element in accordance with the respective value for those data between $L$ and $L + k$; and said means for changing sequentially changes said reference levels $L$ and $L + k$ with a suitable velocity to produce a corresponding sequence of silhouettes of the scanned object on the television screen in at least said black, white and gray colors.

3. The scintillation display apparatus of claim 2, wherein said circuit means assigns a gray level varying in intensity between black and white in correspondence with the level of the data between $L + k$ and $L$, respectively.

4. The scintigram display apparatus as defined in claim 1, wherein said scintillation scanning means is an isocount scintillation scanning means that will stop at each measurement point of a two-dimensional array of measuring points during the time $T$ necessary for the number of input gamma-rays to reach a preset value $N$, and for electronically producing an output signal correlated to the count rate $R = N/T$ at each measuring point, and wherein said means for reading is a buffer register.

5. A scintigram display apparatus as defined in claim 1, wherein said scintillation scanning means is an isocount scintillation scanning means that will stop at each measurement point of a two-dimensional array of measuring points during the time $T$ necessary for the number of input gamma-rays to reach a preset value $N$, and for electronically producing an output signal correlated to count rate $R = N/T$ at each measuring point, and wherein said means for reading is a buffer register.

6. A scintigram display apparatus as defined in claim 5, wherein said scintillation scanning means takes measurements only at the intersections of odd numbered horizontal scan lines with odd numbered vertical lines, which vertical and horizontal scan lines constitute the boundaries of small square picture elements of the two-dimensional scan of the object, and further including two-dimensional interpolation means for receiving the signals and for calculating a separate count rate signal for each of said picture elements by considering at least the three nearest scanning means output signals corresponding to the three nearest measurement points to the picture element, and wherein said circuit means employs said picture element count rate signals for correspondingly intensity modulating the beam for the respective picture elements on the television screen.

7. A scintigram display apparatus as defined in claim 6, further comprising a second comparator circuit means for comparing the data from said reading means, in synchronism with the television sweep signal, and said two comparator circuit means using respectively two reference levels $L$ and $L + k$, said circuit means assigning a white picture element on said television screen to those data smaller than $L$, a black picture element to those data larger than $L + k$, and a gray level picture element in accordance with the respective value for those data between $L$ and $L + k$; and said means for changing sequentially changes said reference levels $L$ and $L + k$ with a suitable velocity to produce a corresponding sequence of silhouettes of the scanned object on the television screen in at least said black, white and gray colors.

8. A scintigram display apparatus as defined in claim 7, wherein said circuit means assigns a gray level varying in intensity between black and white in correspondence with the level of the data between $L + k$ and $L$, respectively.

9. A scintigram display apparatus as defined in claim 1, wherein said scintillation scanning means takes measurements only at the intersections of odd numbered horizontal scan lines with odd numbered vertical scan lines, which vertical horizontal scan lines constitute the boundaries of small square picture elements of the two-dimensional scan of the object, and further including two-dimensional interpolation means for receiving the signals and for calculating a separate count rate signal for each of said picture elements by considering at least the three nearest scanning means output signals corresponding to the three nearest measurement points to the picture element, and wherein said circuit means employs said picture element count rate signals for correspondingly intensity modulating the beam for the respective picture elements on the television screen.

10. A scintigram display apparatus as defined in claim 9, further comprising a second comparator circuit means for comparing the data from said reading means, in synchronism with the television sweep signal, and said two comparator circuit means using respectively two reference levels $L$ and $L + k$; said circuit means assigning a white picture element on said television screen to those data smaller than $L$, a black picture element to those data larger than $L + k$, and a gray level picture element in accordance with the respective value for those data between $L$ and $L + k$; and said means for changing sequentially changes said reference levels $L$ and $L + k$ with a suitable velocity to produce a corresponding sequence of silhouettes of the scanned object on the televisionscreen in at least said black, white and gray colors.

11. A scintigram display apparatus as defined in claim 10, wherein said circuit means assigns a gray level varying in intensity between black and white in correspondence with the level of the data between $L + k$ and $L$, respectively.

12. A scintigram display apparatus employing a television display means having a screen, a beam intensity modulator and a sweep signal, comprising:

a. scintillation scanning means for two-dimensionally scanning over an object emitting gamma-rays and measuring the input gamma-rays only at the intersection of odd numbered horizontal scan lines and odd numbered vertical scan lines, which horizontal and vertical scan lines constitute the boundaries of small square picture elements of the two-dimensional scan of the object for producing a correlated two-dimensional array of output signals correlated to the two-dimensional array of gamma-radiation from the object;

b. memory means for storing the two-dimensional array of said output signals from said scintillation scanning means;

c. two-dimensional interpolation means for calculating a separate count rate for each of said picture elements from at least the three output signals from said scanning means corresponding to the three nearest intersection measurment points to the picture element;

d. read out circuit means for reading out the data stored in said memory means and produced by said interpolation means in synchronism with the television sweep signal for controlling the television picture on the screen to produce a two-dimensional array of picture elements on the television screen corresponding to the two-dimensional array of picture elements correlated to the measurements made by the scintillation scanning means.

13. A scintigram display apparatus as defined in claim 12, wherein said scintillation scanning means is an isocount scintillation scanning means that will stop at each measurement point of a two-dimensional array of measuring points during the time $T$ necessary for the number of input gamma-rays to reach a preset value $N$, and for electronically producing an output signal correlated to the count rate $R = N/T$ at each measuring point.

14. A method of displaying a scintigram on a television screen, comprising the steps of:

a. two-dimensionally scintillation scanning over an object emitting gamma-rays, measuring the input gamma-rays and producing a two-dimensional array of output signals correlated to the two-dimensional array of gamma-radiation from the object;

b. storing the two-dimensional array of said output signals from said scintillation scanning step;

c. reading out the thus stored data corresponding to one scan line at a time of the two-dimensional array;

d. comparing each thus read out datum, in synchronism with the television sweep signal, with a preset slice level and thereby generating a binary signal as the result of such comparison;

e. applying said binary signal as the television beam intensity modulator to assign two different colors on the screen corresponding to the binary signal; and f. changing sequentially said slice level and thereby producing a corresponding sequence of silhouettes of the scanned object on the television screen in at least said two colors.

* * * * *